(12) United States Patent
Erickson et al.

(10) Patent No.: US 7,373,699 B2
(45) Date of Patent: May 20, 2008

(54) PLASTIC SHEET REINFORCEMENT

(75) Inventors: Paul R. Erickson, New Boston, NH (US); Dale E. Turcotte, New Boston, NH (US); William B. S. Mc Dougall, Concord, NH (US)

(73) Assignee: Velcro Industries B.V., Curacao ( * ) Notice: Subject to any disclaimer, the term of this patent is extended or adjusted under 35 U.S.C. 154(b) by 426 days.

(21) Appl. No.: 10/688,301

(22) Filed: Oct. 15, 2003

(65) Prior Publication Data

US 2005/0081342 A1    Apr. 21, 2005

(51) Int. Cl.
 *A44B 18/00*    (2006.01)
(52) U.S. Cl. .......................................... 24/452; 24/442
(58) Field of Classification Search .......... 24/442–452; 164/167, 280, 285, 296, 442, 492; 428/99, 428/100
 See application file for complete search history.

(56) References Cited

U.S. PATENT DOCUMENTS

| | | | |
|---|---|---|---|
| 3,387,345 A | 6/1968 | Savoir | 24/446 |
| 3,426,363 A | 2/1969 | Girard | 2/338 |
| 4,165,555 A | 8/1979 | Boxer et al. | 24/444 |
| 4,402,690 A | 9/1983 | Redfern | 604/391 |
| 4,410,327 A | 10/1983 | Baggaley | 604/391 |
| 4,770,917 A | 9/1988 | Tochacek et al. | 428/95 |
| 4,870,725 A | 10/1989 | Dubowik | 24/452 |
| 4,984,339 A | 1/1991 | Provost et al. | 24/452 |
| 5,176,670 A | 1/1993 | Roessler et al. | 604/391 |
| 5,260,015 A | 11/1993 | Kennedy et al. | 264/167 |
| 5,318,741 A | 6/1994 | Thomas | 264/519 |
| 5,325,569 A | 7/1994 | Goulait et al. | 24/418 |
| 5,326,415 A | 7/1994 | Thomas et al. | 156/244.11 |
| 5,326,612 A | 7/1994 | Goulait | 428/100 |
| 5,368,549 A | 11/1994 | McVicker | 604/6 |
| 5,369,852 A | 12/1994 | Higashinaka | 24/446 |
| 5,369,853 A | 12/1994 | Okawa et al. | 24/446 |
| 5,392,498 A | 2/1995 | Goulait et al. | 24/452 |
| 5,399,177 A | 3/1995 | Blaney et al. | 604/389 |
| 5,399,418 A | 3/1995 | Hartmanns et al. | 428/218 |
| 5,518,795 A | 5/1996 | Kennedy et al. | 428/100 |
| 5,540,673 A | 7/1996 | Thomas et al. | 604/391 |
| 5,607,345 A | 3/1997 | Barry et al. | 451/539 |
| 5,615,460 A | 4/1997 | Weirich et al. | 24/446 |

(Continued)

FOREIGN PATENT DOCUMENTS

FR    2 786 372    6/2000

OTHER PUBLICATIONS

Dictionary of Fiber & Textile Technology, pp. 66-67, Hoechst Celanese Corporation, 1990.

*Primary Examiner*—Robert J Sandy
*Assistant Examiner*—Ruth C Rodriguez
(74) *Attorney, Agent, or Firm*—Fish & Richardson P.C.

(57) ABSTRACT

A strip-form touch fastener component includes a resin base having a front surface from which an array of molded plastic fastener elements project, and a reinforcing knit fabric directly laminated to a side of the resin base opposite the fastener elements, the fabric having float filament sections extending generally along an outer surface of a back side of the fastener component. The float sections are connected to the back side of the fastener component only at their ends, and otherwise lie against the back side of the fastener component to reinforce the resin base against tearing.

55 Claims, 7 Drawing Sheets

U.S. PATENT DOCUMENTS

| | | | |
|---|---|---|---|
| 5,620,769 A * | 4/1997 | Wessels et al. | 24/442 |
| 5,655,268 A | 8/1997 | Keyaki et al. | 24/114.9 |
| 5,669,120 A | 9/1997 | Wessels et al. | 24/446 |
| 5,688,579 A | 11/1997 | Konsti et al. | 428/192 |
| 5,744,080 A * | 4/1998 | Kennedy et al. | 264/167 |
| 5,845,375 A | 12/1998 | Miller et al. | 24/452 |
| 5,851,467 A * | 12/1998 | Murasaki | 264/167 |
| 5,974,635 A | 11/1999 | Murasaki | 24/446 |
| 5,985,407 A * | 11/1999 | Murasaki | 24/444 |
| 6,039,911 A | 3/2000 | Miller et al. | 264/280 |
| 6,131,251 A | 10/2000 | Provost | 24/452 |
| 6,143,222 A * | 11/2000 | Takizawa et al. | 24/442 |
| 6,163,939 A | 12/2000 | Lacey et al. | 24/452 |
| 6,174,476 B1 * | 1/2001 | Kennedy et al. | 264/167 |
| 6,248,419 B1 * | 6/2001 | Kennedy et al. | 24/442 |
| 6,332,250 B1 * | 12/2001 | Igaue et al. | 24/450 |
| 6,484,371 B1 * | 11/2002 | Romanko et al. | 24/306 |
| 6,737,147 B2 * | 5/2004 | Kennedy et al. | 24/306 |
| 6,849,142 B1 * | 2/2005 | Goulait | 156/62.4 |

* cited by examiner

PLASTIC SHEET REINFORCEMENT

TECHNICAL FIELD

This invention relates to reinforcing flexible plastic sheet-form products, and more particularly to reinforcing the sheet-form bases of plastic fastener strips against tearing.

BACKGROUND

Many sheet-form products are economically produced in large volume by continuous molding or calendaring of plastic resins. In the touch fastener industry, molded plastic hook tape has displaced traditional woven fabric fasteners for many applications, simply because of lower production costs. However, molded, rolled or extruded resin fastener tapes are generally found to be more susceptible to tearing than are fastener tapes with woven or knit ground fabrics, particularly when notched such as by sewing the fastener tape to an underlying garment or other product.

Furthermore, the chain-like molecules of the resin forming the strip-form bases of products manufactured in continuous lengths can be found to become somewhat oriented toward the machine, or processing, direction by elongation or drawing of the material while still somewhat molten, further reducing the ability of the final product to resist tears propagating along the length of the tape.

Unfortunately, for many applications the fastener tape is ultimately sewn in place with at least one row of stitches extending along the length of the tape, forming a closely-spaced row of punctures or perforations extending along a direction most susceptible to tearing. It is along this weakened perforation line that load is transferred from the closure to the underlying substrate, through the thread passing through the punctures. Tears frequently result, extending along the stitch line and separating the fastener component from the rest of the product. This tearing may be readily evident, or result in a premature failure in use.

Various improvements have been suggested for increasing the longitudinal tear resistance of molded hook fastener tape. For example, surface features have been molded onto the surface of the base of the tape, between adjacent fastener elements, to help to impede tears propagating along the tape between rows of fastener elements. Strings, screens, yarns, paper and other materials have been laminated to, or embedded in, resin fastener tape bases. Resins of improved material properties have been considered, although for many applications the base resin is the same resin from which the fastener elements are formed, and so resin properties must be selected for fastener element formation and function as well as base tear resistance.

Further improvements in reinforcing plastic fastener tape, and other sheet-form or strip-form resin products, are desired, particularly for increasing tear resistance. Preferably, such improvements can be obtained without substantial increase in overall thickness, stiffness or cost of the final product.

SUMMARY

We have found that particular fabric structures, bonded to the backside of a sheet-form resin base in certain configurations, can significantly increase the tear resistance of the resin base, while maintaining a base thinness and flexibility suitable for many applications. We have even found that the addition of such reinforcing fabrics can enhance the visual appearance and tactile feel of fastener tapes for many uses.

According to one aspect of the invention, a strip-form touch fastener component includes a resin base, a stem and a head disposed on the stem. The resin base has a front surface from which an array of fastener elements project. Each fastener element has a stem extending contiguously from the front surface of the base and formed of resin forming at least a portion of the base and a head disposed on the stem above the base and forming an overhang for releasably engaging fibrous loops. In addition, the strip form touch fastener component includes a reinforcing fabric that includes two distinct layers of yarn, an anchor layer and an outer layer. The reinforcing fabric is on a side of the resin base opposite the fastener elements. The anchor layer faces the resin base and includes filaments embedded within resin of the base to anchor the fabric to the base. The outer layer includes float filament sections extending generally along an outer surface of a back side of the fastener component, such sections connected to the back side of the fastener component only at their ends, and otherwise lying against the back side of the fastener component.

In preferred embodiments where the reinforced fastener product is to be attached to a garment or other article by sewing or stitching, the product has a stitch hole tear strength of at least 2.0 pounds.

In some embodiments, the float filament sections extend generally straight between their connected ends, and are preferably substantially free of resin of the base between their ends.

In some preferred embodiments, the float filament sections extend no more than about 0.3 millimeter from a back surface of the resin base, preferably more than about 0.03 millimeter, and preferably about 0.15 millimeter.

The float filament sections preferably have an average float length of at least about two millimeters, such as between about 2 and 10 millimeters.

Preferably, the average float length of the float filament sections is more than about 10 times as long as the nominal distance the float filament sections extend from a back surface of the resin base.

The float filament sections are preferably arranged in a pattern, such as of at least about 175 float filament sections per square centimeter of the back side of the fastener component.

The float filament sections may be sections of filaments of multifilament yarns of the reinforcing fabric, for example, and may extend in a direction generally across the strip-form fastener component.

In some embodiments, the yarns are multifilament yarns, with each yarn containing from 10 to 13 discrete filaments. The yarns may be between about 20 and 170 denier, with each filament between about 2 and 40 denier.

In some preferred embodiments, the reinforcing fabric is a knit fabric, such as a warp knit fabric. Preferably, the technical face of the fabric faces the resin base, with the technical back providing the float filament sections.

The technical back is preferably in an unnapped condition. The knit fabric preferably includes between about 20 and 60 courses per inch, more preferably between about 47 and 55 courses per inch. The knit fabric preferably includes between about 15 and 60 wales per inch, more preferably between about 32 and 38 wales per inch.

For some applications, the knit fabric is stabilized in a post-knit, cross-wale stretch condition.

According to another aspect of the invention, a strip-form touch fastener component includes a resin base with a front surface from which an array of fastener elements project. Each fastener element has a stem extending contiguously from the front surface of the base and formed of resin forming at least a portion of the base and a head disposed on the stem above the base and forming an overhang for releasably engaging fibrous loops. In addition, the strip form touch fastener component includes a reinforcing fabric directly laminated to a side of the resin base opposite the fastener elements. The fabric is a knit material with float filament sections extending generally along an outer surface of a back side of the fastener component. The float sections are connected to the back side of the fastener component only at their ends, and otherwise lie against the back side of the fastener component.

Various preferred embodiments of this aspect of the invention include features discussed above with respect to the first aspect of the invention.

Another aspect of the invention features a method of reinforcing a resin base of a plastic touch fastener component that has an array of fastener elements extending from a front surface of the resin base. The method includes providing a fabric, laminating the fabric, and forming an array of touch fastener elements. The technical back of the fabric includes an array of float sections of filaments. The fabric is laminated to a back surface of a resin sheet to form a laminate, with the technical face of the fabric facing the resin sheet and the float sections extending along an exposed surface of the laminate. The touch fastener elements are formed extending from a front surface of the resin sheet, each fastener element having a resin stem extending contiguously from resin of the front surface of the resin sheet.

In some implementations, the fabric is laminated to the resin sheet as the resin sheet is formed from molten resin.

In some cases, the fabric is laminated to the resin sheet by introducing both the fabric and moldable resin to a nip adjacent a rotating roller, applying pressure to infuse the resin into surface features of the fabric, and then cooling the resin to secure the resin to the fabric. The nip may be defined between two counter-rotating rollers or between the rotating roller and an extrusion nozzle, for example.

In some embodiments, the rotating roller defines an array of molding cavities, the applied pressure also forcing the resin into the molding cavities to form at least the stems of the fastener elements.

In some cases, the cavities are shaped to form complete, engageable fastener elements.

In the product as produced, the float filament sections preferably have ends secured to the laminate and extending generally straight between their ends, with the float filament sections preferably substantially free of resin of the sheet between their ends.

Prior to laminating, the fabric to the resin sheet, the fabric may be stretched across a width of the fabric, such as in a cross-wale direction.

In some cases, the lamination is performed in a continuous process defining a machine flow direction, with the stretching reorienting the float sections to increase their orientation toward a direction extending perpendicular to the machine flow direction. The fabric is, in some examples, stretched sufficiently to straighten the float sections of filaments.

For some applications, the fabric is stabilized in its stretched condition prior to laminating the fabric to the resin sheet.

Various other features of preferred embodiments of the method have been discussed above with respect to the product.

We use the term 'float' in its usual sense as understood in the textile industry. For a knit, a float or float segment or float yarn is a portion of yarn that extends for some distance across the fabric without being knitted in. In weaving, a float or float segment is a portion of yarn, such as a filling yarn, that extends over two or more adjacent perpendicular yarns, such as warp yarns, or vice versa. In either case, the float segment has a float length defined as the length of the yarn segment between anchor points.

Float yarn segments are typically found on the technical back of the product. The technical back is the rough side of a fabric, and with the exception of some pile fabrics, the side traditionally considered less aesthetically pleasing. In a knit, the float segments are generally found on the technical back. On most textile fabrics, the technical face, on the other hand, is generally the smoother face, with the more finished appearance.

The reinforced fastener products described herein can be particularly useful for applications where the product is to be attached to a garment or other article by sewing or stitching, or in other applications requiring increased tear resistance. The 'exoskeleton' of exposed, straight, preferably taut float yarns may also be more appealing than a smooth resin surface for some applications, in that it provides a "textile" appearance and "hand" to the back of the plastic substrate. The reinforcement methods and fabrics described herein are also useful for reinforcing non-fastening products and substrates.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
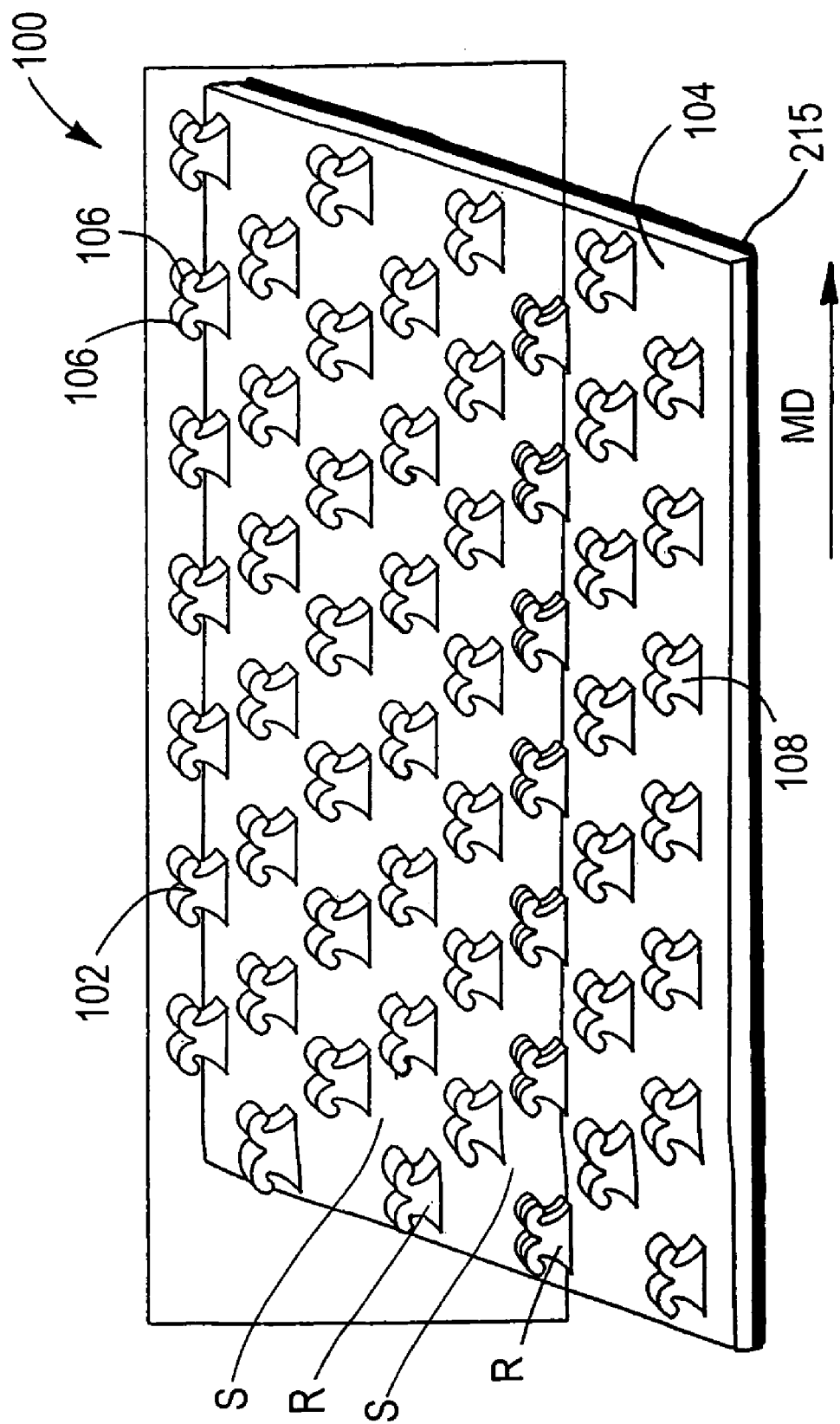
FIG. 1 is a perspective view of a male fastener component.

Referring to FIG. 1, a male touch fastener component 100 includes a field of fastener elements 102 arranged in rows R extending outwardly from and integrally with a sheet-form base 104. Spacing S between rows may be controlled by the manufacturing process and will be discussed further below. Fastener elements 102 are palm tree-shaped hooks and are engageable in two directions along a plane (i.e., an engagement plane) perpendicular to sheet-form base 104 the in direction of rows R. Each fastener element 102 includes two heads 106 extending from a single stem 108.

Male fastener component 100 is designed to, for example, strongly engage a low pile height, loop touch fastener component, particularly a loop component with loops formed of, for example, a high strength multifilament yarn or a high strength monofilament. High strength loops are desirable for fasteners for high strength applications requiring high cycle life, as the resist breakage at higher peel loads. Typically, high strength yarns and monofilaments are made by extrusion. Generally, the process includes a draw-down step to impart orientation on the yarn or monofilament so as to improve, for example, tenacity of the yarn or monofilament. High strength fibers may also be formed by other methods, for example, by solution spinning. Suitable high strength loop filament materials include, for example, polyamides, polyesters, polyurethanes, ultra-high molecular weight solution spun polyethylene (e.g., SPECTRA® polyethylene), aramids (e.g., KEVLAR®), acrylics and rigid rod polymers like poly(p-phenylene-2,6-benzobisoxazole).

Figure 2:
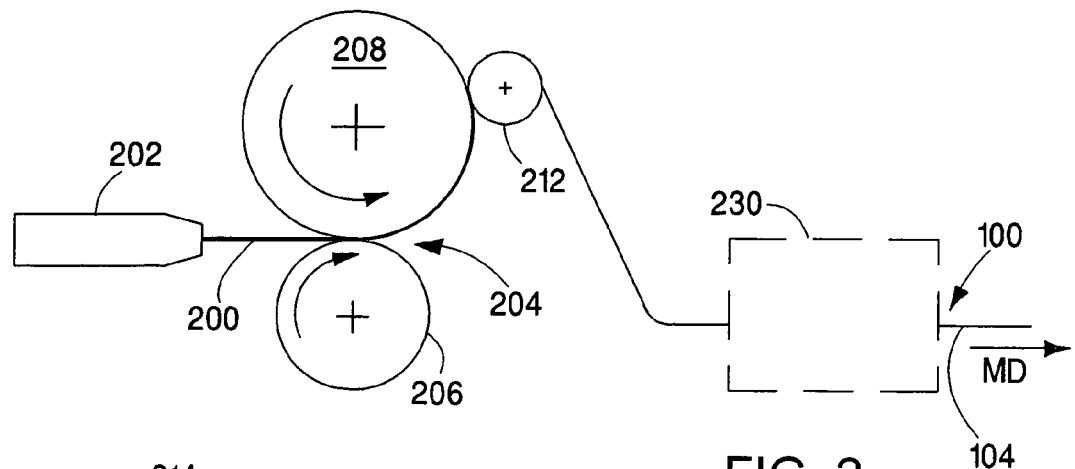
FIGS. 2 and 3 illustrate alternate molding processes for forming fastener components.

The fastener elements of FIG. 1 can be molded in the shapes shown. Referring to FIG. 2, thermoplastic resin 200 is extruded as a molten sheet from extruder 202 and introduced into nip 204 formed between a pressure roll 206 and a counter-rotating mold roll 208 defining fastener element-shaped cavities in its surface. Pressure in the nip causes thermoplastic resin 200 to enter these blind-ended forming cavities to form the fastener elements, while excess resin remains about the periphery of the mold roll and is molded between the rolls to form sheet-form base 104. The thermoplastic resin is cooled as it proceeds along the periphery of the mold roll, solidifying the fastener elements, until it is stripped by stripper roll 212. The molded fastener elements distend during de-molding, but tend to recover substantially their as-molded shape. It is generally understood that fastener element crooks molded to face downstream tend to distend slightly more than those molded to face upstream, and can remain more distended in the final product. The direction of travel of the material illustrated in FIG. 2 is referred to as the "machine direction" (MD) of the material and defines the longitudinal direction of the resulting product, while the cross-machine direction (CD) is perpendicular to the machine direction within the plane of the sheet-form base. Further details regarding processing are described by Fischer, U.S. Pat. No. 4,775,310 and Clune et al., U.S. Pat. No. 6,202,260, the disclosures of which are hereby incorporated in full by reference. Further details of a useful fastener element shape can be found in a U.S. patent application filed concurrently herewith, entitled "TOUCH FASTENER ELEMENTS" and assigned Ser. No. 10/688,031, the contents of which are also incorporated herein by reference.

In some embodiments, the mold roll 208 comprises a face-to-face assembly of thin, circular plates or rings (not shown) that are, for example, about 0.003 inch to about 0.250 inch (0.0762 mm-6.35 mm) thick, some having cut-outs in their periphery defining mold cavities and others having solid circumferences, serving to close the open sides of the mold cavities and serve as spacers, defining the spacing between adjacent fastener element rows. A fully "built up" mold roll may have a width, for example, from about 0.75 inch to about 6 inches (1.91 to 15.24 cm) or more and may contain, for example, from about 50 to 1000 or more individual rings. Further details regarding mold tooling are described by Fisher, U.S. Pat. No. 4,775,310.

Figure 3:
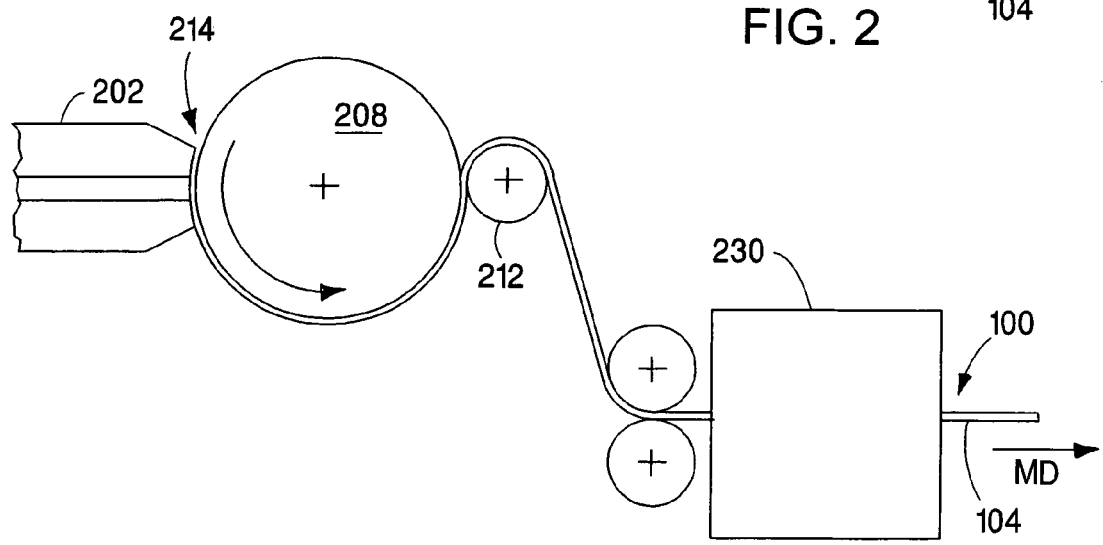

An alternate technique for molding fastener elements is shown in FIG. 3. The process is similar to that described above with reference to FIG. 2, except only a mold roll 208 is used. In other words, no pressure roll 206 is necessary. Here, the extruder 202 is shaped to conform to the periphery of the mold roll 208 and the extruded resin 200 is introduced under pressure directly to a gap 214 formed between mold roll 208 and extruder 202. The molded fastener component is stripped from the mold cavities by a stripper roll 212 as described above. Further details regarding this process are described by Akeno, U.S. Pat. Nos. 5,781,969 and 5,913,482, the disclosures of which are hereby incorporated in full by reference.

The fastener elements can also be formed by first molding or otherwise forming an array of stems extending from a resin base, and then post-forming engageable heads on the stems, such as by heat and/or pressure applied to the ends of the stems in a subsequent operation. The fastener elements can also be formed by cut-and-stretch techniques, such as those taught by Nestegard et al., U.S. Pat. No. 4,895,569, the contents of which are hereby incorporated by reference.

Figure 4:
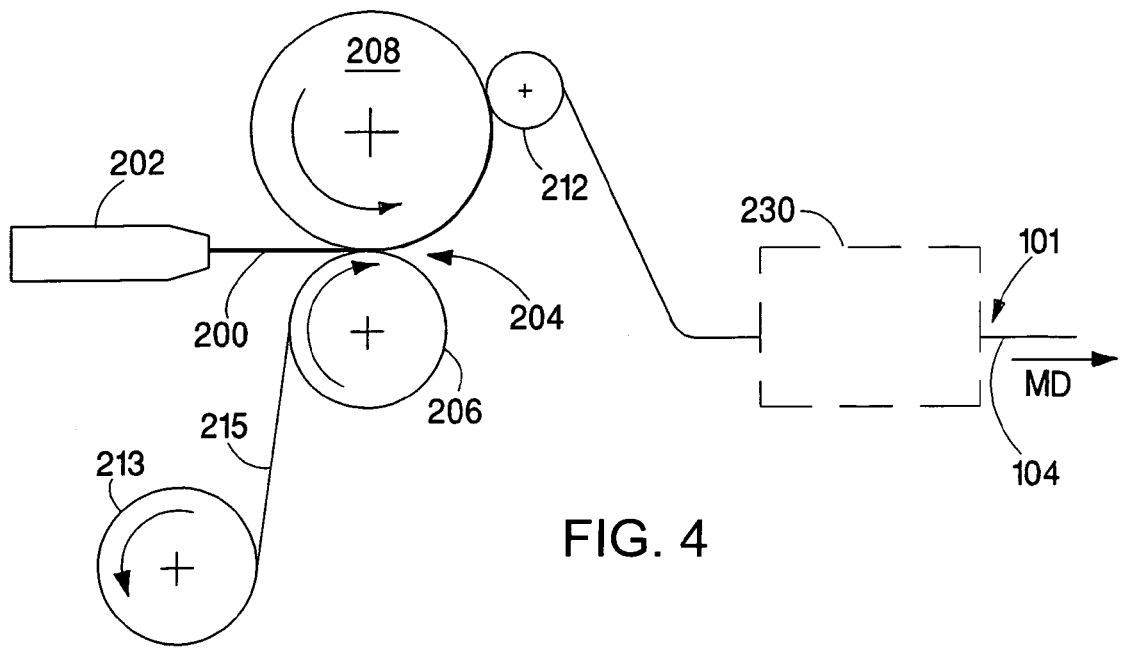
FIG. 4 illustrates a process for forming a laminated fastener product.
Figure 5:
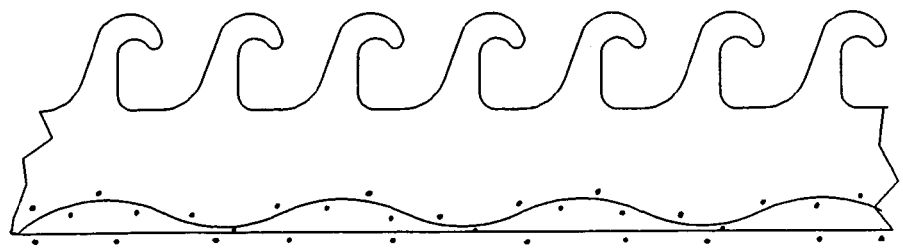
FIG. 5 is an enlarged cross-section of a product formed by the process of FIG. 4.

Referring to FIGS. 4 and 5, a laminated male touch fastener component 101 may be formed by introducing a pre-form material 215 into nip 204 between the mold and pressure rolls. As a result of the heat and pressure in nip 204, pre-form material 215 becomes laminated and bonded to the thermoplastic resin 200 simultaneously with the forming of the fastener elements. The result can be a contiguous molded structure, without weld lines, extending from the tips of the fastener elements into the pre-form material, where the resin can intimately bond with features or fibers of the material to form a strong, permanent bond. Further details regarding this process are described by Kennedy et al., U.S. Pat. No. 5,260,015, the disclosures of which is hereby incorporated in full by reference.

In one useful embodiment, pre-formed material 215 is a loose knit scrim, such as Knit 3901 from Velcro USA in Manchester, N.H., although Velcro USA loop products 3900, 3905, and 3400 may also be employed. These fabrics are 2 bar tricot knit fabrics, whose technical back sides are typically brushed or napped to raise the surface floats and create a hook-engageable loop surface. Knit 3901 is a similar 2 bar Tricot knit nylon fabric which generally must be brushed or napped before it can be employed as the functioning loop of a hook and loop closure. However, it has been found to function well as a reinforcement when at least partially encapsulated by, or bonded to, the base resin contiguous with the resin forming the hooks, without brushing or napping. Reinforcing the base with such a scrim has been found to improve the stitch tear strength of the product, providing a resin-base hook product practical for attachment by sewing or stitching.

Figure 6:
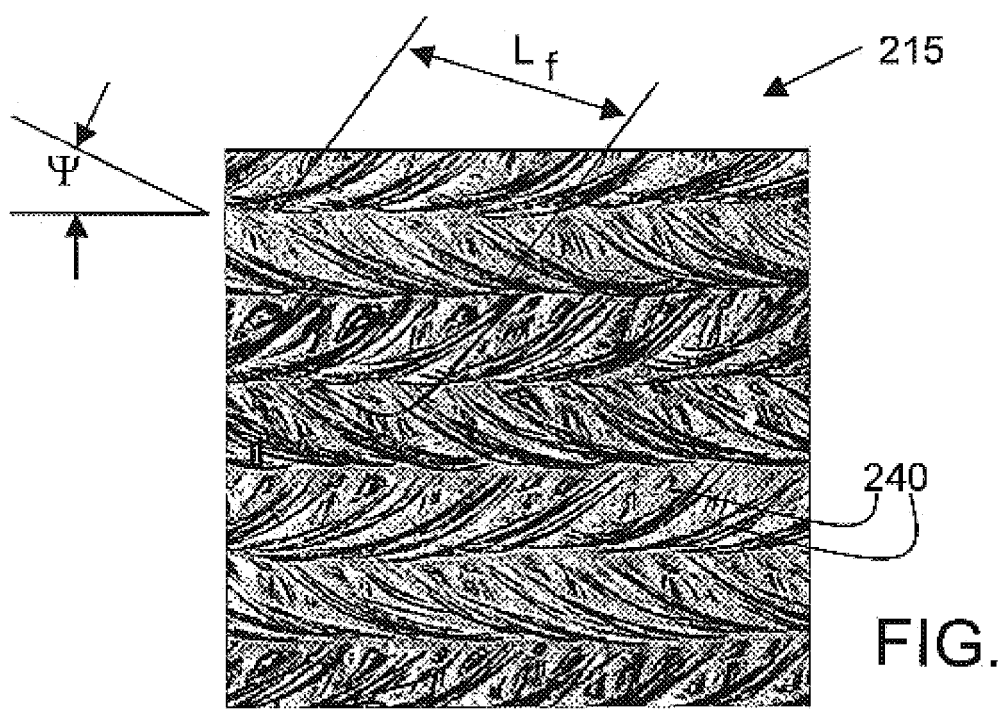
FIG. 6 is an enlarged photograph of the back surface of the fastener product of FIG. 1.

FIG. 6 shows the textile appearance provided by the laminated scrim material 215. As shown, the knit scrim includes an array of exposed float segments 240 extending across the surface of the scrim, in a generally regular, herringbone pattern. If this warp knit scrim were to be employed as an engageable loop material rather than as a thin reinforcement for the hook base, these float segments would have been raised from the fabric surface to form a loop pile, such as by brushing or napping, prior to lamination. However, these float segments 215 have been intentionally left flat against the surface of the fabric for improved reinforcement against tearing, as discussed below.

Scrim 215 has two distinct layers of yarns, creating what is referred to in the textile trades as the technical face and the technical back of the fabric. The ground and top yarns of knit scrim 215 are 40 denier multifilament yarns, each yarn comprising 12 filaments. A variety of yarn deniers are available on the market. In this application deniers from 20-170, with a variety of filament counts may be used, including monofilaments. Finer denier yarns however, are preferred for creating thinner lighter weight fabrics. Each ground and top yarn filament in this example is 3.3 denier, however a variety of filament deniers could be employed ranging from micro denier to 40 denier per filament. The ground and top yarns can be of Nylon 6 or Nylon 6.6, for example, or other textile yarn materials such as polyester or polypropylene. In this example, the ground and top yarns are of regular tenacity filaments, with tenacities of approximately 4.5 grams per denier. High tenacity yarns may provide additional tear strength for more severe applications. These yarns are also considered yarns with regular elongation. High elongation yarns or even elastomeric stretch yarns such as "Spandex" or rubber may be useful for some applications.

Scrim 215 is a Tricot warp knit, but other acceptable knits may include Rachelle, Milanese, flat, or circular knits. Knits with laid in yarns may also increase tear strength. Woven or Malimo fabrics may also be employed to some advantage. Scrim 215 is fabricated on a 2 bar warp knitter, but multi bar machines, such as a 3 bar knitter could also be used. The scrim is made on a 32 gauge warp knit machine, with 32 needles per inch of fabric width, such that the product from the machine, prior to stretching or shrinking, has approximately 32 wales per inch. Similar fabrics can be made on courser gauge machines, such as 20 or 28 gauge, or finer machines, such as 36 gauge. The scrim is constructed with 47 to 55 courses (stitches) per inch, but acceptable fabrics, made by varying the courses from 20 to 60 courses per inch, can be made as needed for the application. This course count can also be varied somewhat in final finishing by compacting or stretching the fabric on a tenter frame. The scrim has about 32 to 38 wales (ends) per inch, but could be modified to contain anywhere from 15 to 60 wales per inch, by changing the machine gauge or stretching or compacting fabric width on the tenter frame. In the final product shown, there are about 185 float segments 240 per square centimeter on the back side of the fastener tape.

Figure 7:
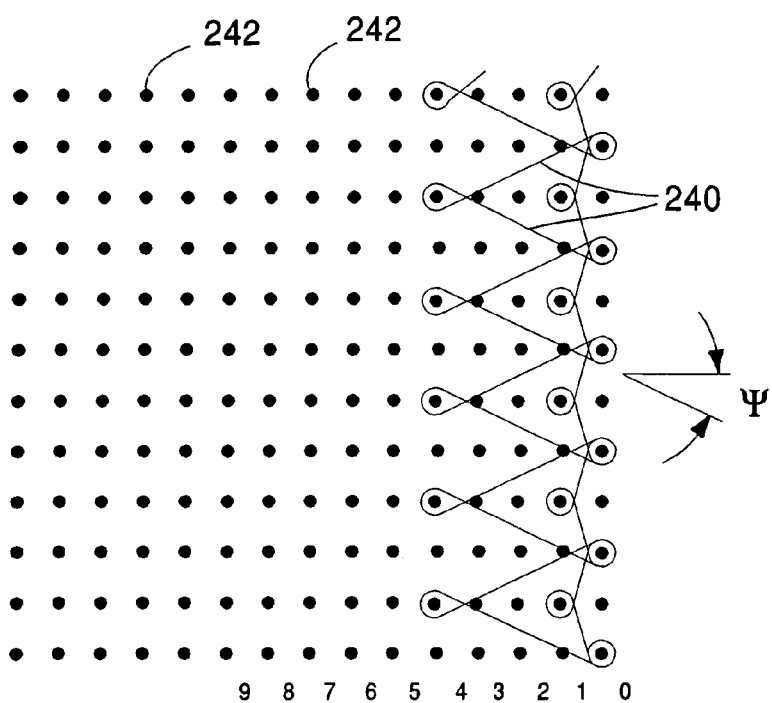
FIG. 7 illustrates a warp knit pattern.

FIG. 7 illustrates a knit pattern for a two-bar warp knit (i.e., performed on a knitting machine with two bars, known generally as Bar 1 or the back bar, and Bar 2 or the front bar), showing the float yarn segments 240. In this figure, each dot 242 represents a knitting needle. There are two chain stitches shown running down the length of the figure. One chain is from one set of yarn beams (to Bar 1), forming the ground or technical face of the fabric. Bar 1 holds all the ends from this beam on the needle bed, and traverses back and forth across two needles in a 1-0/1-2 motion. Bar 2 contains all the ends of yarn from a second set of yarn beams, which form the technical back of the fabric. With a 4-5 motion, the front needle bar traverses over 3 empty needles on every stitch. With a simple change in the stitch cam on the knit machine, this needle bar can be made to traverse over fewer needles (such as 2 empty needles in a 3-4 motion) to create a shorter float, or traverse over more than 5 needles to create a longer float. Bar 2 alternates back and forth on every stitch (envision a zigzag stitch in a sewing machine), creating floating yarn segments 240. One float segment 240 is created on every course. The more needles the bar crosses, the longer the float.

In a 3 bar knit, the third yarn could be employed to form a float pattern that overlaps the float pattern of the second yarn, such that each float segment of the final product overlaps another float segment in a direction extending across the width of the fabric (i.e., with each wale being crossed by floats of each of the second and third yarns).

The technical back of the fabric could be brushed or napped to raise the float yarns 240 from the side of the fabric and lengthen the length of the float segments, to create a pile for use as a loop fastener, but for use as a reinforcement (and to keep the product advantageously thin) we prefer to leave the float yarns lying on the surface of the fabric. Thus, the scrim is preferably unnapped, with the unnapped pile yarn from the Bar 2 top beam laying on surface of the ground fabric. The unnapped pile yarn floats back and forth across the ground fabric, which is believed to improve tear strength in the final product, particularly when exposed on the back side of the laminate and not bonded against the surface of the fabric.

Longer floats are believed to improve the tear strength more than shorter floats. The length of the float is changed by modifying the motion of Bar 2. Longer floats traverse more ends of the fabric ground, bridging potential tear lines between adjacent wales. The frequency of floats in the fabric length direction can be changed by modifying the courses per inch of fabric. Increasing the stitches per inch increases the floats per inch, and can also increase the float angle $\psi$ in relation to the wales. A float angle approaching 90 degrees is thought to provide the highest tear resistance. Decreasing the stitches per inch decreases the floats per inch. A more open knit product, with fewer stitches per inch, may have a smaller float angle, and it is thought that this construction would provide less favorable tear resistance improvement than the higher float angles. In the example shown in FIG. 6, the average float length $L_f$ is about 5 millimeters, but float lengths between about 2 and 10 millimeters are envisioned for yarns of this denier.

Figure 8:
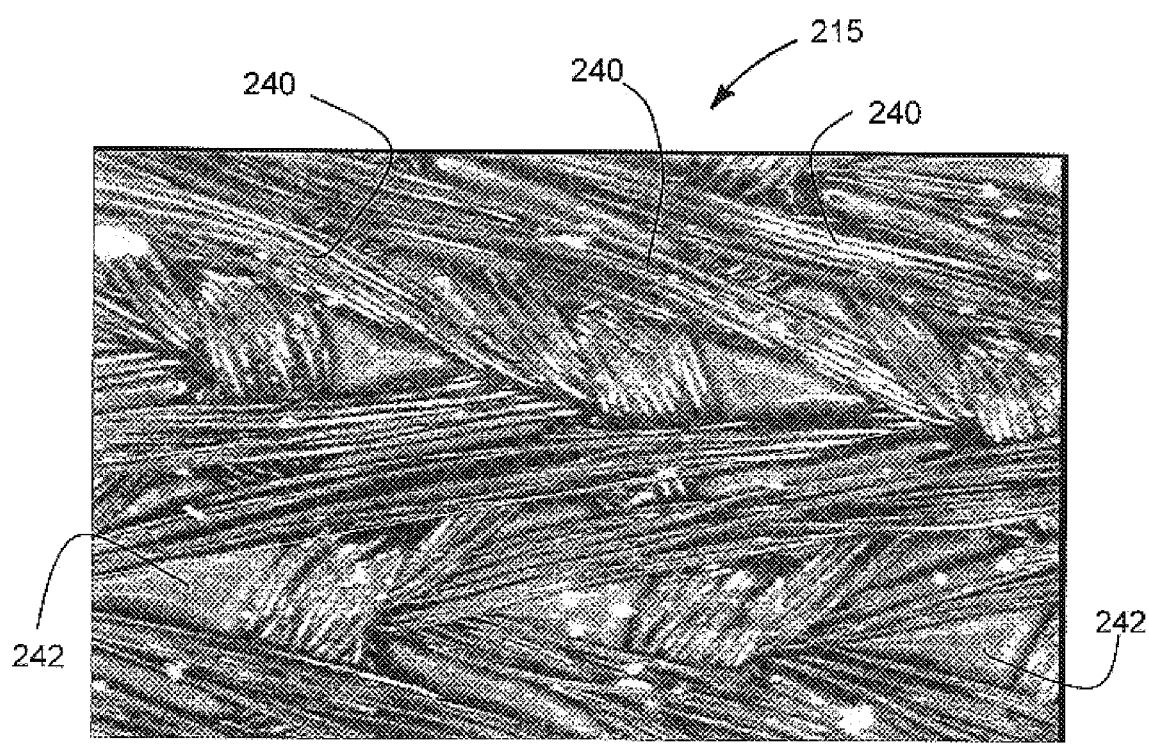
FIG. 8 is another enlarged photograph of the back surface of a fastener product, with a laminated scrim reinforcement.
Figure 9:
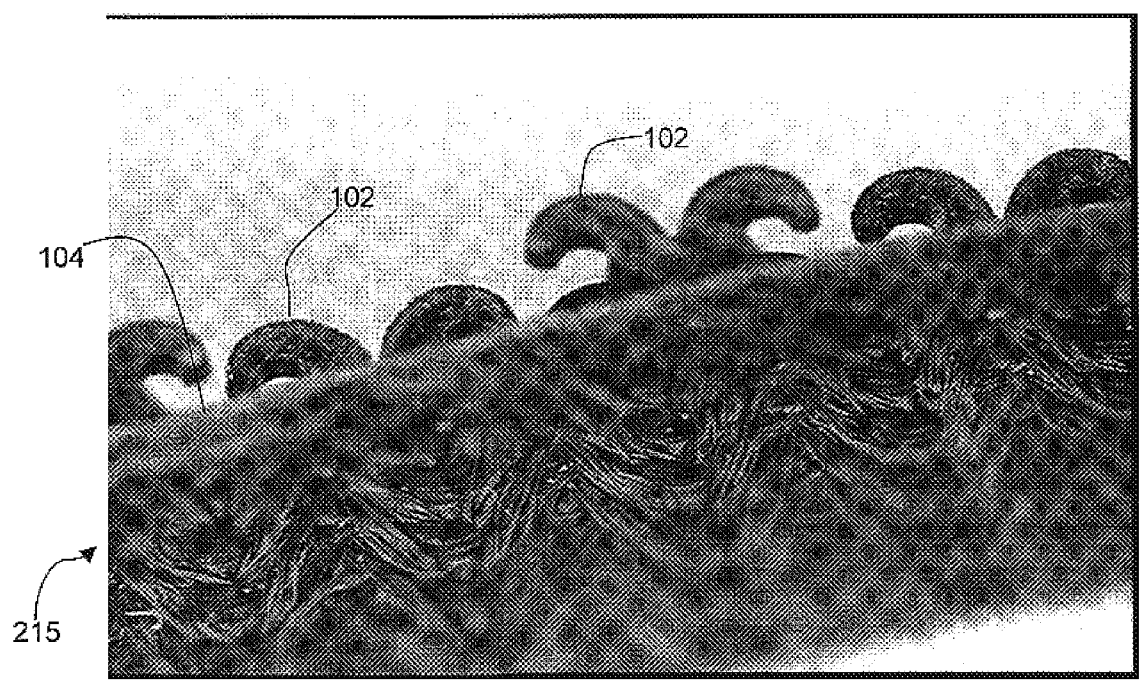
FIG. 9 is a rear perspective view of a reinforced fastener product, showing an edge.

As shown in FIGS. 8 and 9, the float segments 240 are each of multifilament yarns, and define spans generally free of resin 242 from the laminated hook base 104. The float sections tend to extend no more than about 0.17 millimeter from the back surface of the resin base, although the infusion of the resin into the scrim makes the depth of resin vary. As can be seen in the figure, the float sections 240 are much longer than they are high; in other words, they tend to extend only a short distance above the resin and over a rather long span. This low aspect ratio makes them particularly unsuitable for hook engagement, but is believed to increase their utility for tear resistance. FIG. 9 in particular shows the relative spacing of the float pattern with respect to the size of the fastener elements.

The scrim is knitted 160 inches wide and then slit into two 80-inch widths for further processing. Of course, after removal from the knitting machine, the knit tends to relax to a narrower overall width. If the scrim fabric is dyed or washed prior to finishing, the fabric width is substantially reduced due to shrinkage in wet processing and relaxation of the fabric stitch. Dyed fabrics are stretched out in width on a tenter frame approximately 45 percent as they are coated. If scrim is processed without dyeing, such shrinkage and tightening does not occur until the fabric is heated on the tenter frame. The undyed fabric in this case is stretched enough to eliminate wrinkling, and the edges are pinned to the rails on the tenter frame. The fabric passes through the oven and is coated in its pinned state. Shrinkage occurs in the oven, providing further tightening of the fabric. The scrim fabric is preferably stretched sufficiently to eliminate widthwise stretchiness in the width direction. The scrim in this example is stretched to an overall width of about 72 inches.

A stiffening agent or coating is applied to the technical face of the fabric while on the tenter frame in its stretched state. This coating aids in the processing of the fabric during lamination. The coating should be applied so as not to encapsulate the float, bind the float to the ground surface of the fabric, or make the float rigid. The coating may be applied in foam form, in a light application to minimize wicking through to the technical back of the fabric. The foam is preferably applied to the technical face of the product, such as with a parabolic applicator. A useful acrylic binder is Vinamul Duracryl 69A, available from National Starch and Chemical of Bridgewater, N.J. Applying such a binder at a rate of 0.02 to 0.03 pounds per lineal yard has been found to give the fabric sufficient stability during lamination, while not inhibiting bonding to the hook resin. In certain cases where an unstabilized, greige fabric is acceptable, uncoated scrim material may also be used. More details about methods and equipment for stabilizing lightweight fabrics with binders can be found in Shepard et al, U.S. Pat. No. 6,342,285, the contents of which are incorporated herein by reference.

The scrim fabric may be stretched sufficiently in width that the float pile yarns are reoriented to increase the float angle ψ of the exposed float yarn segments with respect to the wale direction. It is believed that this reorientation may improve tear reinforcement properties by helping to absorb energy and/or redirect tear-inducing forces in the final product. It may also be that making the floating stitches more straight and taut as laminated to the resin enables the exposed stitches to bear and redirect potentially tearing loads at much lower resin strains. The arrangement of floating stitch sections forms, in a sense, an external, textile, reinforcing skeleton for the product.

The scrim fabric is preferably laminated to the plastic hook resin with the technical face of the fabric embedded in the resin, or at least bonded to the resin by solidification of the resin in contact with surface features of the fabric, and the unnapped pile float exposed on the backside of the final product and free of the hook resin, such that the floating stitches on the technical back do not become encapsulated in the plastic, but are only held at the ends of the stitch. The central portions of the floating stitches are thus free to reorient to help carry loads that might otherwise cause local resin yielding and lead to tear propagation. The technical face of the fabric provides an effective barrier for the hook resin, keeping the resin from flooding the floats.

"Stitch Hole Tear Strength" is measured according to the following test method, on un-engaged fastener components. A line of holes is made along the center of width of each eight-inch by one-inch test sample, with a 0.044 inch, medium ball needle, at a stitch rate of 11 to 13 stitch holes per inch, without thread, starting around three inches from a first end of the sample. The sample is then conditioned for at least 20 hours at 69.8 to 77 degrees Fahrenheit and 45 to 55 percent relative humidity. A straight line is cut from the first end of the sample to the nearest hole, forming two separate tabs. The sample is then held by the tabs and torn by moving the two tabs apart by motion within the plane of the sample and perpendicular to the line of holes, at a separation speed of 11.5 to 12.5 inches per minute, until the sample exhibits a total tear length of about five inches. Disregarding data from the first and last 12-second period of the loading, the five highest load peaks are averaged and reported to the nearest 0.1 pound increment.

A number of embodiments of the invention have been described. Nevertheless, it will be understood that various modifications may be made without departing from the spirit and scope of the invention. Accordingly, other embodiments are within the scope of the following claims.

What is claimed is:

1. A strip-form touch fastener component comprising
   a resin base having a front surface from which an array of fastener elements project, each fastener element having
      a stem extending contiguously from the front surface of the base and formed of resin forming at least a portion of the base; and
      a head disposed on the stem above the base and forming an overhang for releasably engaging fibrous loops; and
   a reinforcing fabric on a side of the resin base opposite the fastener elements, the fabric comprising two distinct layers of yarns, including
      an anchor layer facing the resin base and comprising filaments embedded within resin of the base to anchor the fabric to the base; and
      an outer layer comprising float filament sections extending generally along an outer surface of a back side of the fastener component, such sections connected to the back side of the fastener component only at their ends, and otherwise lying against the back side of the fastener component.

2. The touch fastener component of claim 1 wherein the float filament sections extend generally straight between their connected ends.

3. The touch fastener component of claim 2 wherein the float filament sections are substantially free of resin of the base between their ends.

4. The touch fastener component of claim 1 wherein the float filament sections extend no more than about 0.3 millimeter from a back surface of the resin base.

5. The touch fastener component of claim 4 wherein the float filament sections at least about 0.03 millimeter from the back surface of the resin base.

6. The touch fastener component of claim 4 wherein the float filament sections extend about 0.15 millimeter from the back surface of the resin base.

7. The touch fastener component of claim 1 wherein the float filament sections have an average float length of at least about two millimeters.

8. The touch fastener component of claim 7 wherein the average float length is between about 2 and 10 millimeters.

9. The touch fastener component of claim 1 wherein an average float length of the float filament sections is more than about 10 times as long as a nominal distance the float filament sections extend from a back surface of the resin base.

10. The touch fastener component of claim 1 wherein the float filament sections are arranged in a pattern of at least about 150 float filament sections per square centimeter of the back side of the fastener component.

11. The touch fastener component of claim 1 wherein the float filament sections are sections of filaments of multifilament yarns of the reinforcing fabric.

12. The touch fastener component of claim 1 wherein the float filament sections extend in a direction generally across the strip-form fastener component.

13. The touch fastener component of claim 1 wherein the yarns are multifilament yarns.

14. The touch fastener component of claim 13 wherein each yarn contains from 10 to 13 discrete filaments.

15. The touch fastener component of claim 13 wherein the yarns are between about 20 and 170 denier.

16. The touch fastener component of claim 13 wherein each yarn filament is between about 2 and 40 denier.

17. The touch fastener component of claim 1 wherein the reinforcing fabric is a knit fabric, knit to define a technical face and a technical back.

18. The touch fastener component of claim 17 wherein the technical face faces the resin base, with the technical back providing the float filament sections.

19. The touch fastener component of claim 18 wherein the technical back is in an unnapped condition.

20. The touch fastener component of claim 17 wherein the float filament sections extend no more than about 0.3 millimeter from a back surface of the resin base.

21. The touch fastener component of claim 20 wherein the float filament sections at least about 0.03 millimeter from the back surface of the resin base.

22. The touch fastener component of claim 17 wherein an average float length of the float filament sections is more than about 10 times as long as a nominal distance the float filament sections extend from a back surface of the resin base.

23. The touch fastener component of claim 17 wherein an average float length of the float filament sections is between about 2 and 10 millimeters.

24. The touch fastener component of claim 17 wherein the reinforcing fabric is a warp knit fabric.

25. The touch fastener component of claim 24 wherein the fabric comprises between about 20 and 60 courses per inch.

26. The touch fastener component of claim 25 wherein the fabric comprises between about 47 and 55 courses per inch.

27. The touch fastener component of claim 24 wherein the fabric comprises between about 15 and 60 wales per inch.

28. The touch fastener component of claim 27 wherein the fabric comprises between about 32 and 38 wales per inch.

29. The touch fastener component of claim 17 wherein the fabric is stabilized in a post-knit, cross-wale stretch condition.

30. The touch fastener component of claim 1 having a Stitch Hole Tear Strength of at least 2.0 pounds.

31. A strip-form touch fastener component comprising
a resin base having a front surface from which an array of fastener elements project, each fastener element having
a stem extending contiguously from the front surface of the base and formed of resin forming at least a portion of the base; and
a head disposed on the stem above the base and forming an overhang for releasably engaging fibrous loops; and
a reinforcing fabric directly laminated to a side of the resin base opposite the fastener elements, the fabric comprising a knit material with float filament sections extending generally along an outer surface of a back side of the fastener component, such sections connected to the back side of the fastener component only at their ends, and otherwise lying against the back side of the fastener component.

32. The touch fastener component of claim 31 wherein the float filament sections extend generally straight between their connected ends.

33. The touch fastener component of claim 32 wherein the float filament sections are substantially free of resin of the base between their ends.

34. The touch fastener component of claim 31 wherein the float filament sections extend no more than about 0.3 millimeter from a back surface of the resin base.

35. The touch fastener component of claim 34 wherein the float filament sections at least about 0.03 millimeter from the back surface of the resin base.

36. The touch fastener component of claim 34 wherein the float filament sections extend about 0.15 millimeter from the back surface of the resin base.

37. The touch fastener component of claim 31 wherein the float filament sections have an average float length of at least about two millimeters.

38. The touch fastener component of claim 37 wherein the average float length is between about 2 and 10 millimeters.

39. The touch fastener component of claim 31 wherein an average float length of the float filament sections is more than about 10 times as long as a nominal distance the float filament sections extend from a back surface of the resin base.

40. The touch fastener component of claim 31 wherein the float filament sections are arranged in a pattern of at least about 150 filament sections per square centimeter of the back side of the fastener component.

41. The touch fastener component of claim 31 wherein the float filament sections are sections of filaments of multifilament yarns of the reinforcing fabric.

42. The touch fastener component of claim 31 wherein float filament sections extend in a direction generally across the strip-form fastener component.

43. The touch fastener component of claim 31 wherein the yarns are multifilament yarns.

44. The touch fastener component of claim 43 wherein each yarn contains from 10 to 13 discrete filaments.

45. The touch fastener component of claim 43 wherein the yarns are between about 20 and 170 denier.

46. The touch fastener component of claim 45 wherein the yarns are about 40 denier.

47. The touch fastener component of claim 43 wherein each yarn filament is between about 2 and 40 denier.

48. The touch fastener component of claim 47 wherein each yarn filament is between about 3 and 5 denier.

49. The touch fastener component of claim 31 wherein the reinforcing fabric is knit to define a technical face and a technical back, the technical face facing the resin base and the technical back providing the float filament sections.

50. The touch fastener component of claim 31 wherein the reinforcing fabric is in an unnapped condition.

51. The touch fastener component of claim 31 wherein the reinforcing fabric is a warp knit fabric.

52. The touch fastener component of claim 51 wherein the fabric comprises between about 20 and 60 courses per inch.

53. The touch fastener component of claim 51 wherein the fabric comprises between about 15 and 60 wales per inch.

54. The touch fastener component of claim 31 wherein the fabric is stabilized in a post-knit, cross-wale stretch condition.

55. The touch fastener component of claim 31 having a Stitch Hole Tear Strength of at least 2.0 pounds.

* * * * *